UNITED STATES PATENT OFFICE.

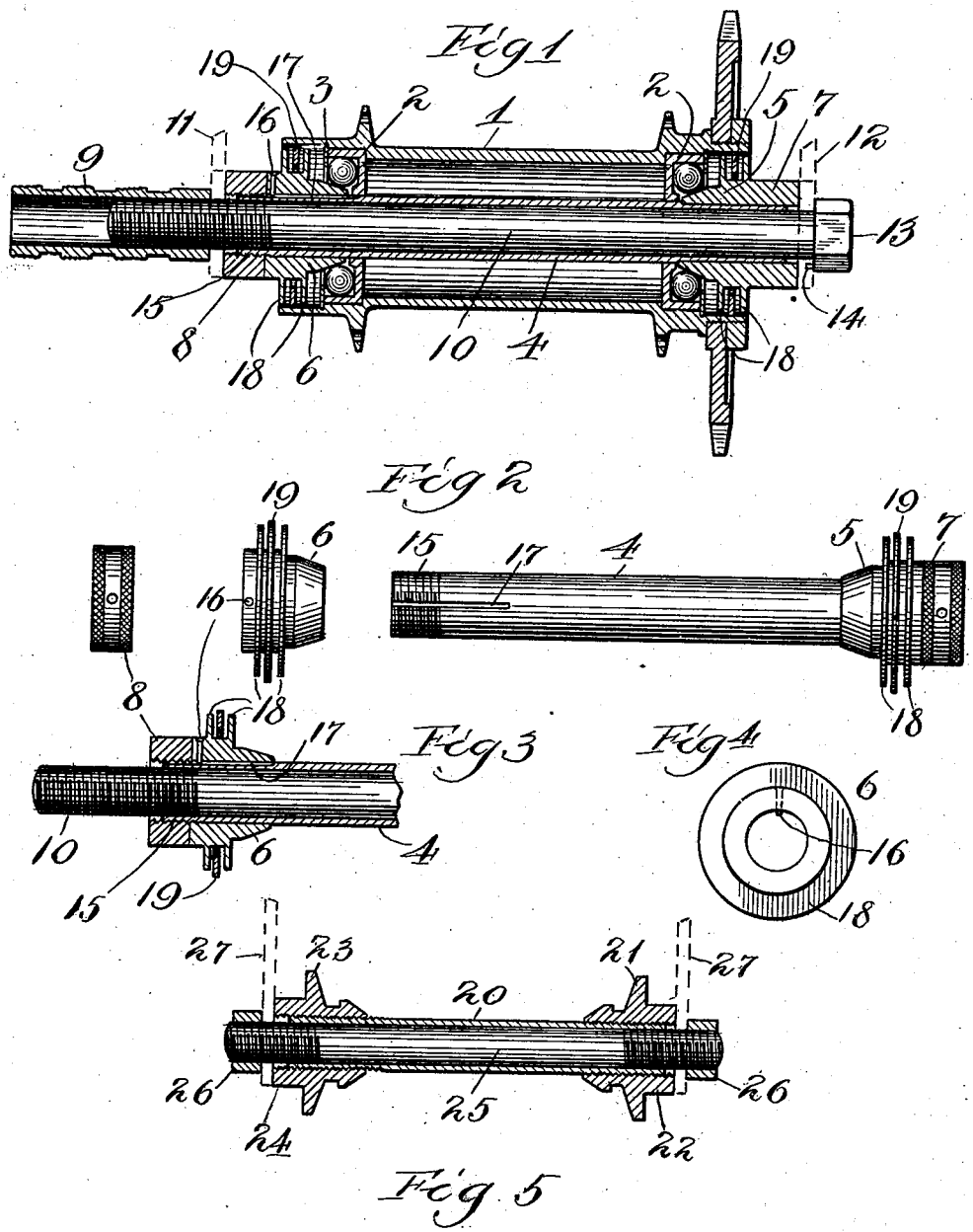

JOHN W. BLODGETT, OF CHICAGO, ILLINOIS.

HUB.

SPECIFICATION forming part of Letters Patent No. 710,241, dated September 30, 1902.

Application filed May 24, 1900. Serial No. 17,836. (No model.)

*To all whom it may concern:*

Be it known that I, JOHN W. BLODGETT, a resident of Chicago, in the county of Cook and State of Illinois, have invented certain new and useful Improvements in Hubs, of which the following is a specification.

My invention relates to hubs for vehicles, but more especially for bicycles and the bearings therefor; and the object thereof is to provide a new, simple, and perfect axle and bearings containing features of advantage not found in present structures. With my tubular axle and bearings all washers and set-nuts are avoided and simple means are provided for adjusting the wheel in the frame and removing it therefrom.

My invention embodies novel and advantageous constructions and arrangements of parts, as will be apparent from the description hereinafter given.

In the drawings, Figure 1 is a central section of my hub as applied to the rear wheel of a bicycle; Fig. 2, an elevation of the tubular axle, cones, and adjusting-nut separated from the hub proper; Fig. 3, a section of one of the cones, together with a portion of the tubular axle; Fig. 4, an end elevation of the adjustable cone, and Fig. 5 a central section of a modified form of construction.

The hub proper or casing 1 may be of the ordinary and well-known construction, and, as shown, it is provided with the usual ball-cups 2, secured in the barrel of the hub, and also is provided with the usual annular ring or ball-retainer 3.

The tubular axle 4, which carries the bearing-cones and is located in the casing of the hub, is made of a piece of steel tubing of the proper size, according to the size of the solid axle to be used. It is desirable, if not necessary, to make this axle with great care, and to this end I ream it out, so as to get a perfectly smooth and straight hole or bore, after which it is put on a perfectly true arbor and turned to the form as shown in Fig. 1.

The cones 5 and 6 are carried by the tubular axle, and so that the cones and axle may be perfectly true with respect to each other I prefer to have the ends of the tubular axle turned up true and the cones bored and reamed to perfectly fit and slide on the ends of the tubular axle. The cone 5 has an extension 7, which may be integral with such cone, and the extension of the cone 6 is, in fact, an adjusting-nut 8.

The tubular axle must be shorter than the extension of the cones, so that when the nut of the solid axle or clenching-stud 10 is tightened the cones, tubular axle, and both forks 11 and 12 of the frame of the bicycle are all equally tightened at the same time by the one nut of the clenching-stud. This clenching-stud is preferably a bolt, having a nut and screw-threads at one end and a head 13 at the other end, although it will be understood that the usual spindle or stud with screw-threads and nuts at both ends might be employed. The bolt-head is preferably provided with a small pin adapted to enter a socket or recess on the outer surface of one of the forks, so as to prevent the bolt-head from turning.

The bearing-cone 5 is pressed onto one end of the tubular axle and is intended to remain practically permanent, although it can be forced off when desired. The other bearing-cone 6 is adapted to slip over the other end of the tubular axle, passing over its screw-threads 15, preferably upon the portion of the tubular axle which has been accurately turned to receive it. Such screw-threads are thereby left exposed and the adjusting-nut 8 screws thereon to hold the bearings in proper and adjusted position. To prevent the cone 6 from rotating, but to permit of a movement longitudinal of the tubular axle, I provide such cone with a small pin or key 16 or equivalent device to engage in a longitudinal groove 17 in the end of the tubular axle.

As clearly shown in the drawings, each cone is provided with two parallel circumferential flanges 18, between which vaseline or the like is packed. Before the parts are assembled a ring or washer 19, of leather, pasteboard, or other suitable material and of the same diameter as the open ends of the hub, is inserted between each pair of flanges. This construction effectually prevents the entrance of dust or dirt into the bearings proper, inasmuch as any dust must necessarily force its way around underneath the inner edge of the ring which is embedded in the vaseline. Furthermore, this dirt-excluding device adds practically no friction to the wheel.

It will be understood that any usual barrel of a hub may be used with the ball-cups pressed into the barrel of the hub against a shoulder, as clearly shown in Fig. 1. Obviously the ball-cups may be screwed in or the hub may be turned up true on an arbor and the ball-cups pushed in, as described, such latter construction being preferred, because it provides a truer and better bearing than any other construction.

In assembling the parts of the hub the ball-cups are put in place and then the balls and ball-retainers are inserted. The cone 5 is pressed upon its proper end of the tubular axle, which is now passed through the hub. The other cone is then pressed over the threaded end of the tubular axle and such cone is pressed until it comes in contact with the balls. In assembling the cone 6 its small pin or key 16 is caused to register with the groove 17. The adjusting-nut is now screwed on the tubular axle until it forces the cone inward, leaving but a little play. The hub is now ready to be inserted in the frame of the wheel, and when this is done the clenching-stud is passed through the tubular axle and the nut 9 is screwed up tight, so that the hub is securely held to the frame. Tightening up the nut of the clenching-stud perfectly fastens the cones and tubular axle to the forks of the frame.

Any usual axle for a bicycle may be used for a clenching-stud; but the preferred form is the one above described, consisting of a stud or bolt with a thread and nut on one end and a head on the other end.

The advantages of my hub arise principally from the particular construction of the tubular axle, which, as shown and described, is made shorter than the cones and their extensions. If the tubular axle was long enough to extend even with the outside surfaces or ends of the cones or was longer than such cones, the head of the clenching-stud and the nut would fail to fasten the cones, because they would come in contact with the tubular axle and leave the cones with nothing to secure them, so that the cones would in such event be liable to work loose at any time. Furthermore, by the use of this novel form of tubular axle the objectionable tightening of the bearings when the hub or wheel is being secured to the frame is entirely avoided. After the bearings are once properly adjusted the securing of the wheel or hub in the frame has no effect upon the adjustment, inasmuch as the cones are in no wise disturbed, owing to the peculiar construction and arrangement of the parts.

Other advantages arise from the novel method of securing the cones upon the axle. Inasmuch as the cones are pressed onto the tubular axle, the parts being made perfectly true to receive each other instead of being screwed thereon, lateral play is avoided and the bearings can be adjusted so that the wheel will run true. This is impossible when the cone screws onto the axle, because the cone must be fitted loose enough to be readily turned, in which case lateral play cannot be prevented.

While I have illustrated my invention as applied to the rear hub of a bicycle, for instance, and have shown thereon the usual sprocket, it will be perfectly obvious that the invention is applicable to all kinds of hubs.

While I prefer to use the construction of hub illustrated in Fig. 1, where the cones are pressed upon the tubular axle, which is accurately turned to receive them, it will be understood that both ends of the tubular axle may be screw-threaded and the cones correspondingly screw-threaded, so as to screw upon the tubular axle instead of being pressed thereon. This modified form of construction is illustrated in Fig. 5, wherein the tubular axle 20 is screw-threaded at both ends. One or the other of the two bearing-cones may be screwed up as far as it will go and the other bearing-cone be used to obtain the proper adjustment. In this drawing I have shown the bearing-cone 21 as screwed up tight on the tubular axle, but with its extension 22 projecting beyond the end of the tubular axle. The bearing-cone 23 is the adjusting-cone, and its extension 24 also extends beyond the end of the tubular axle, so that such axle is likewise shorter than the distance between the bearing-cones and their extensions. The clenching-stud 25 passes through the tubular axle, and, as shown, is provided at both ends with screw-threads to receive tightening-nuts 26 for the purpose of securing the hub to the forks 27 of the frame of a bicycle or other vehicle.

I claim—

1. In a device of the class described, the combination with the hub having the cups in the ends thereof and the balls in the cups, of the tubular axle, the cones on said axle, one of which is movable longitudinally to regulate the distance between said cones to adjust the bearings formed by the cups, balls and cones, and means coöperating with said cones to secure them in the desired position of adjustment, the tubular axle being of such a length relative to the length of the hub that the outer end of one of said cones is beyond the end of the tubular axle in all positions of adjustment; substantially as described.

2. In a device of the class described the combination with the hub, the cups in its ends and the balls in the cups, of the tubular axle, the cones on the ends of said axle adjustable longitudinally thereon relative to each other to regulate the distance between them to adjust the bearings formed by the cups, balls and cones, and means coöperating with said cones to secure them in the desired position of adjustment, the tubular axle being so short that in all positions of adjustment the outer ends of the cones are necessarily beyond the adjacent ends of the axle for the purpose described.

3. In a device of the class described, the combination with the hub, the cups in its ends and the balls in the cups, of the tubular axle, the cones on the ends of said axle, one of which is movable longitudinally thereon to regulate the distance between said cones to adjust the bearings formed by the cups, balls and cones, the rod adapted to pass through the tubular axle and having an abutment at one end and screw-threaded at the other end, and the nut on the end of the rod whereby the cones and tubular axle can be clamped between said abutment and nut, the tubular axle being so short that in all positions of adjustment the outer end of one of the cones is necessarily beyond the coöperating end of the axle for the purpose described.

4. In a device of the class described, the combination with the hub, the cups in its ends and the balls in the cups, of the tubular axle, the cones on said axle having their outer ends extending beyond the ends of said axle in all positions of adjustment of the cones longitudinally thereon to regulate the distance between said cones to adjust the bearings formed by the cups, balls and cones, the rod adapted to pass through the tubular axle and having the abutment at one end and screw-threaded at the other end, and the nut coöperating therewith so that the cones can be clamped on the tubular axle between said abutment and nut.

5. In a device of the class described, the combination with the hub, the cups in its ends and the balls in the cups, of the tubular axle screw-threaded on one end and having a longitudinal groove in the same end, the cones on the ends of said axle, one of which is movable longitudinally thereon and is prevented from turning, a key on the interior thereof sliding in the groove in the axle, the adjusting-nut controlling the position of the adjacent cone and adapted to be secured on the end of the tubular axle, and means coöperating with said cones and adjusting-nut to secure them in the desired position of adjustment, the tubular axle being so short that in all positions of adjustment the outer end of the adjusting-nut is necessarily beyond the coöperating end of the axle for the purpose described.

6. In a hub, the combination, with balls, ball-cups and a tubular axle having screw-threads at one end, of bearing-cones fitted to and pressed upon said axle, one of such cones having a movement longitudinal of the axle, an adjusting-nut on the screw-threaded end of the axle, one end of such axle being within one cone and the other end within the adjusting-nut, and a clenching stud or bolt securing the hub to a frame whereby the pressure is against the cones and not against the ends of the axle.

7. In a hub, the combination, with balls, ball-cups and a hub-casing, of a bearing-cone having two substantially parallel annular flanges extending circumferentially thereof and in close proximity to the sides or walls of the barrel of the hub-casing.

8. In a hub, the combination, with balls, ball-cups and a hub-casing, of a bearing-cone having two substantially parallel annular circumferential flanges extending into close proximity to the barrel of the hub-casing, and an annular ring fitting said barrel and depending into the space between said flanges.

JOHN W. BLODGETT.

Witnesses:
LOUISE E. SERAGE,
SAMUEL E. HIBBEN.